United States Patent Office 2,813,524
Patented Nov. 19, 1957

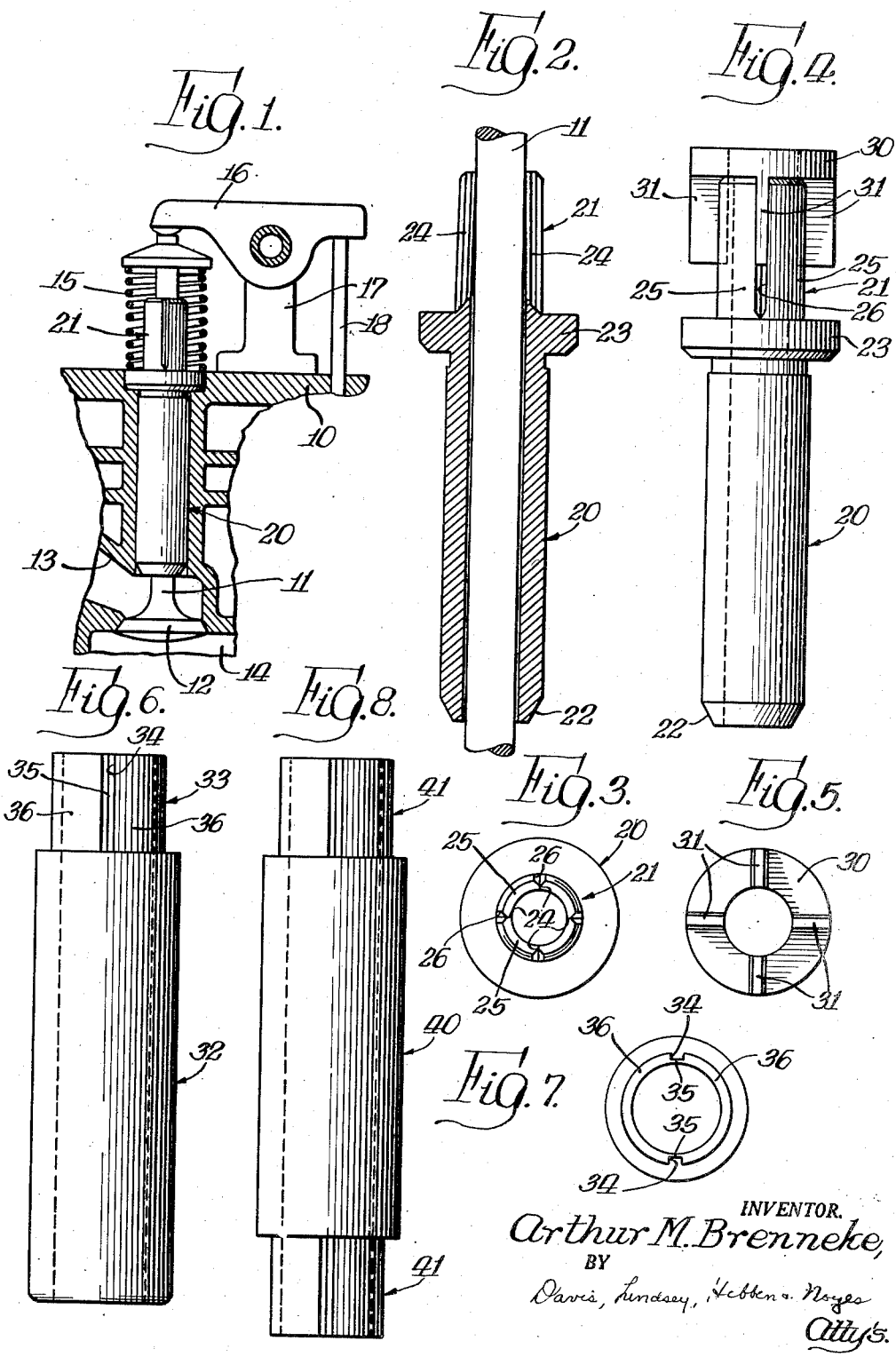

2,813,524

COMBINED VALVE STEM SEAL AND GUIDE

Arthur M. Brenneke, Hagerstown, Ind., assignor to Perfect Circle Corporation, Hagerstown, Ind., a corporation of Indiana Application June 23, 1955, Serial No. 517,529

7 Claims. (Cl. 123—188)

The invention relates generally to valve means for internal combustion engines and more particularly to a combined seal and guide for the stem of the valve.

The general object of the invention is to provide a novel guide for the stem of a valve for an internal combustion engine, which is combined with a seal to prevent oil from running along the stem toward the head of the valve.

Another object is to provide a combined valve stem seal and guide which supports the stem of the valve to a greater extent than the usual form of guide, and which, in addition, prevents excess oil from working through the guide to the head of the valve.

A further object is to provide a combined valve stem seal and guide which is replaceable.

Other objects and advantages will become apparent from the following description taken in connection with the accompanying drawing, in which:

Fig. 1 is a fragmentary view of the valve operating mechanism and valve of an internal combustion engine and provided with a combined valve stem seal and guide embodying the features of the invention;

Fig. 2 is a longitudinal sectional view of the combined valve stem seal and guide shown in Fig. 1, with the valve stem extending through it;

Fig. 3 is a plan view of the upper end of the combined valve stem seal and guide;

Fig. 4 is a side elevational view of the combined valve stem seal and guide with a tool mounted thereon for performing one of the steps in the process of manufacture;

Fig. 5 is a bottom plan view of the tool illustrated in Fig. 4;

Fig. 6 is a side elevational view of a modified form of combined valve stem seal and guide;

Fig. 7 is a top plan view of the combined valve stem seal and guide shown in Fig. 6; and Fig. 8 is a side elevational view of another modified form of combined valve stem seal and guide.

In the ordinary internal combustion engine of the type used for automotive purposes, the stem of each valve is mounted in a valve guide which may be formed as a part of the cylinder head or as a separate guide press-fitted into the head. A rocker arm operated from the cam shaft of the engine bears against the end of the valve stem opposite to the valve head to open and close the valve. Because of the metal-to-metal contact of the rocker arm and the valve stem, oil is supplied to the point of contact through the rocker arm.

In many engines, the flow of oil from this source is so excessive that some of it flows along the stem of the valve to the valve head and is drawn into the combustion chamber, in the case of intake valves, or mixes with the exhaust gas, in the case of exhaust valves. In a new engine, the flow of oil in this manner is limited to some extent by the fit of the valve guide around the stem, but as the valve guide and stem wear, the tendency for excess flow increases. In the case of engines with overhead valves, gravity tends to increase the flow in this manner. In the case of L-head engines, excess oil from this source may form a mist around the valve and may be drawn into the combustion chamber in the case of intake valves, or may be mixed with the exhaust gas in the case of exhaust valves.

Excess oil from this source causes an unnecessary oil consumption for the engine since more oil can flow in this manner than is necessary for the mere lubrication of the valve stem in the valve guide. Improperly operating piston rings are usually blamed for any condition where there is an excess oil consumption in an engine, and in many instances the piston rings have been blamed for excessive oil consumption where excess oil flow really resulted from the condition mentioned above.

To cure this condition, I have provided a seal placed around the valve stem at the side of the valve guide remote from the head of the valve and thus restrict the flow of oil along the stem of the valve. The seal is constructed so that sufficient oil can pass by to properly lubricate the valve guide but not in such quantities as will cause the difficulties referred to above. While the upper end of the valve guide has some scraping action on the stem of the valve to remove some of the oil, the seal above the valve guide proper removes excess oil creeping along the stem and permits it to be drained off rather than to be forced through the guide.

As mentioned above, the seal may be formed separately from the valve guide or may be formed integrally therewith when the guide is of the type that is press-fitted into the cylinder head. The combined valve stem seal and guide disclosed herein is of the latter type. It comprises generally a guide portion adapted to be press-fitted into the cylinder head, and a seal portion which is longitudinally split to render it expansible and has its internal bore tapered, from a diameter at its lower end which is at least equal to the diameter of the bore in the guide portion, to a slightly smaller diameter at the top so that it hugs the valve stem to effect a seal around the stem.

In Fig. 1 of the drawings, I have illustrated a portion of the valve-operating mechanism of an engine with a combined valve stem seal and guide embodying the features of the invention. Thus, in this view, the cylinder head is indicated at 10, and mounted in the head 10 is a valve comprising a valve stem 11 and a valve head 12 positioned to open and close the passage 13 communicating with the combustion chamber 14 of the engine. The valve stem 11 projects upwardly through the head and extends above the head and is urged upwardly by a spring 15 to close the passage. To open the passage, the valve is adapted to be depressed by a rocker arm 16 pivotally mounted on a bracket 17 on the head 10, and the rocker arm in this instance is shown as being actuated by a push rod 18 adapted to be operated by the cam shaft of the engine in the usual manner.

The combined valve stem seal and guide is mounted in the head of the engine and supports the valve stem during reciprocation thereof. The combined valve stem seal and guide, in the preferred embodiment, is shown as comprising a guide portion indicated generally at 20, and a seal portion indicated generally at 21. The guide portion 20 is of elongated cylindrical form preferably of uniform diameter such that it will have a press fit in the bore provided in the cylinder head casing. At its lower end, the guide portion may be bevelled as at 22. At its upper end, the guide portion may be provided with a flange 23 adapted to seat in a counterbore in the upper surface of the cylinder head.

The seal portion 21 of the combined valve stem seal and guide is preferably generally cylindrical and is longitudinally split as at 24, and the internal bore of the seal portion 21 is tapered from a diameter at least equal to the diameter of the bore through the guide portion to a slightly less diameter at the upper end of the seal portion. Thus, because of the taper and the longitudinal split, the seal portion at its upper end will resiliently hug the valve stem and remove excess oil therefrom during the reciprocation of the stem. The oil thus removed is free to flow down over the outside of the seal portion 21 so that it will not be carried into the guide portion and thus find its way to the combustion chamber of the engine or the passages communicating therewith.

While one longitudinal slit in the seal portion may be sufficient in certain instances, depending upon the resilience and thickness of the metal from which the seal portion is formed, in this instance I have shown four longitudinal slits 24 which divide the seal portion into an equal number of arcuate members 25.

Preferably the longitudinal slits 24 are of minimum circumferential width and in the preferred construction are formed by fracturing the metal so that no metal is removed to form the slit. In order to facilitate fracturing along longitudinal lines to form the slits, the exterior of the seal portion 21 is provided with grooves 26 which extend part way through the thickness of the seal portion and are preferably V-shape at the bottom of the grooves as shown in Fig. 3. The seal portion 21 is then expanded, preferably by driving wedge means longitudinally into the grooves 26, so that the metal is fractured along the line of the bottom of the V. By providing a V-shape at the bottom of the groove, the line of the fracture is made substantially straight. In this manner, the seal portion 21 is separated into a plurality of arcuate members 25 without removing any metal at the slits formed by the fractures.

In manufacturing this combined valve stem seal and guide, the outside is first turned to the desired diameters. A hole is then drilled throughout the entire length of the article and preferably this is then bored to a slightly greater but uniform diameter. The longitudinal grooves 26 are then milled in the outer surface of the seal portion 21 and the wedge means for fracturing the seal portion to provide the slits 24 is then applied.

In Figs. 4 and 5 I have illustrated the tool constituting the wedge means for fracturing the metal of the seal portion. In the preferred form, this tool comprises an annular top plate 30 provided with a plurality of radially positioned downwardly extending legs 31. The legs 31 have their side faces slightly tapered toward the lower end thereof so that as they are inserted into the grooves and driven downwardly therein, they form wedges bearing against the sides of the grooves to produce forces which will fracture the metal along the line of the bottom of the V of the grooves. The tool 30, after being driven downwardly in this manner, is left on the article to retain the arcuate members 25 in expanded position. The article is then rebored throughout its entire length and reamed to the desired internal diameter for the finished size of the guide portion 20. Because of the expanded position of the arcuate member 25 due to the wedge means, less metal is removed from the interior of the upper end of the seal portion 21 than from the lower end thereof and from the guide portion 20. The wedge means is then removed, permitting the arcuate members 25 to spring back to their normal position. When the arcuate members are in their normal position, the bore through the seal portion 21 is tapered from its lower end towards its upper end because of the fact that less metal was removed from its upper end than from its lower end.

With this construction, the bore through the guide portion 20 is such that it properly supports the valve stem for reciprocating movement without undue friction. The seal portion, being tapered, resiliently engages the valve stem at the upper end of the seal portion and thus provides a resilient seal about the valve stem to remove excess oil that tends to run along the valve stem.

Because of the action of the rocker arm which actuates the valve stem, there is usually a side component of force exerted on the valve stem which tends to cause the valve stem guide to wear into a bell-mouthed form at both ends and particularly at the upper end thereof. By providing the seal portion 21 which constitutes an extension of the guide member, the valve stem is given greater support against such lateral force and because of the resilience of the arcuate members constituting the seal portion, the wear therein is not excessive. Consequently the provision of a valve stem seal of the character herein disclosed not only prevents the passage of excess amounts of oil but also provides added support for the valve stem and prevents undue wear of the guide. The added contact of the seal portion with the valve stem also carries off more heat from the valve and thus tends to reduce the operating temperature thereof.

The modified construction shown in Figs. 6 and 7 is generally similar to that disclosed in Figs. 1 to 4. Thus it comprises a guide portion indicated generally at 32 and a valve stem seal portion indicated generally at 33. In this instance, the guide portion 32 is cylindrical and of uniform diameter throughout its length, the diameter being such that it will have a press-fit in the cylinder head.

The seal portion 33, in this form, is shown as having a pair of longitudinally extending grooves 34 to provide thin walls at the bottoms of the grooves which are adapted to be fractured longitudinally of the seal portion, as indicated at 35. Thus the fractures 35 form a pair of arcuate members 36.

In making this form of device, the exterior of the combined valve stem seal and guide is turned to the diameters shown in Fig. 6. The entire length of the device is then bored to a uniform diameter less than the finished diameter. The longitudinal grooves 34 are also cut in the seal portion 33 at this time. The fractures 35 may be made by a tool such as is shown in Figs. 4 and 5 comprising wedges driven into the grooves 34, or any other suitable tool may be utilized to expand the seal portion 33 and thus fracture the metal along the lines 35. In this instance, however, after the fractures are formed, the tool for performing this operation is removed from the piece. The entire length of the device is then rebored with a tool which is of a size suitable for producing the desired internal diameter for the guide portion 32. However, during this reboring, because of the resilient character of the arcuate members 36, these members will bend outwardly so that less metal will be removed from the interior of the upper end of the arcuate members than from the lower end thereof. Thus after the tool is withdrawn from the work, the arcuate members 36 will spring back to their normal position and the interior of the seal portion has a taper from the diameter of the guide portion upwardly to a lesser diameter at the top of the seal portion. The seal portion is thus formed to resiliently hug the stem of the valve tightly to scrape off excess oil during the reciprocation of the valve stem.

The form shown in Fig. 8 comprises a guide portion 40 and a seal portion 41 at both ends of the guide portion 40. The seal portions 41 may be formed either in the manner shown in Figs. 1 to 4 or in the manner shown in Figs. 6 and 7. In the present instance, the seal portions 41 are similar to those shown in Figs. 6 and 7. With this construction, a seal which resiliently hugs the valve stem to scrape oil therefrom is provided at the upper end of the guide portion 40, and the portion 41 at the lower end serves to carry away heat from the valve stem because of its contact with the stem adjacent the head of the valve.

I claim:
1. A combined valve stem seal and guide comprising a guide portion having an internal bore for slidably supporting the valve stem, and a seal portion at one end of said guide portion, said seal portion being longitudinally split and having a bore which tapers inwardly from the bore in the guide portion toward the outer end of the seal portion.

2. A combined valve stem seal and guide comprising a guide portion having an internal bore for slidably supporting the valve stem, and a seal portion at one end of said guide portion, said seal portion having one or more slits extending from the outer end substantially for the full length of the seal portion to render the seal portion expansible, said seal portion having a bore which is of the same diameter at its inner end as the bore in the guide portion and which tapers toward the outer end to resiliently encircle the valve stem.

3. A combined valve stem seal and guide comprising a guide portion having an internal bore for slidably supporting the valve stem, and a seal portion at one end of said guide portion, said seal portion having at least two slits extending longitudinally from its outer end to form a plurality of arcuate members integrally extending from the guide portion, said seal portion having a bore which at its inner end is of the same diameter as the bore in the guide portion, and which tapers toward the outer end whereby said arcuate members resiliently engage the valve stem.

4. A combined valve stem seal and guide comprising a guide portion having an internal bore for slidably supporting the valve stem, and a seal portion at one end of said guide portion, said seal portion having at least two slits extending longitudinally from its outer end to form a plurality of arcuate members integrally extending from the guide portion, said seal portion having an external diameter smaller than said guide portion and having a bore which tapers from the diameter of the bore of the guide portion toward the outer end of the seal portion whereby said arcuate members hug the stem at their outer ends to provide a seal about the stem.

5. A combined valve stem seal and guide comprising a guide portion having an internal bore for slidably supporting the valve stem, and a seal portion at one end of said guide portion, said seal portion being longitudinally split by fracture to sever the seal portion longitudinally without removal of material from the opposed edges of the split, said seal portion having a bore which tapers from the diameter of the bore in the guide portion toward the outer end of the seal portion.

6. A combined valve stem seal and guide comprising a guide portion having an internal bore for slidably supporting the valve stem, and a seal portion at one end of said guide portion, said seal portion having a bore which tapers from at least the diameter of the bore in the guide portion to a diameter at the outer end less than the diameter of the bore in the guide portion, said seal portion having one or more longitudinally extending grooves in its outer surface and being longitudinally fractured between the groove and the bore.

7. A combined valve stem seal and guide comprising a guide portion having an internal bore for slidably supporting the valve stem, and a pair of sealing portions at the respective ends of the guide portion, each sealing portion being longitudinally split and having a bore which tapers from the diameter of the bore in the guide portion toward the outer end of the seal portion, the sealing portion near the head of the valve carrying away heat and the sealing portion remote from the head removing excess oil from the stem.

References Cited in the file of this patent
UNITED STATES PATENTS

| | | |
|---|---|---|
| 2,124,362 | Zahodiakin | July 19, 1938 |
| 2,128,414 | Hewel | Aug. 30, 1938 |
| 2,319,546 | Insley et al. | May 18, 1943 |